United States Patent
Mochizuki

(10) Patent No.: US 7,034,956 B2
(45) Date of Patent: Apr. 25, 2006

(54) IMAGE PROCESSING APPARATUS CAPABLE OF FREELY VARYING ASPECT RATIO, AND IMAGE FORMING APPARATUS USING THE SAME

(75) Inventor: Yasuyuki Mochizuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 826 days.

(21) Appl. No.: 09/900,451

(22) Filed: Jul. 9, 2001

(65) Prior Publication Data
US 2002/0015190 A1    Feb. 7, 2002

(30) Foreign Application Priority Data
Jul. 7, 2000    (JP)    .............................. 2000-206368

(51) Int. Cl.
*G06K 15/00*    (2006.01)

(52) U.S. Cl. .................. 358/1.2; 382/258; 382/298

(58) Field of Classification Search ................ 358/448, 358/451; 382/254, 257, 258, 298, 299, 1.2, 382/3.12, 3.26, 3.27

See application file for complete search history.

(56) References Cited

U.S. PATENT DOCUMENTS

| 5,748,755 A * | 5/1998 | Johnson et al. ............. 382/115 |
| 6,456,732 B1 * | 9/2002 | Kimbell et al. ............. 382/112 |
| 2002/0015190 A1 * | 2/2002 | Mochizuki .................. 358/451 |

FOREIGN PATENT DOCUMENTS

| JP | 10-117262 | 5/1998 |
| JP | 1034104 | * 12/1998 |
| JP | 11-177802 | 7/1999 |
| JP | 11-234514 | 8/1999 |

* cited by examiner

Primary Examiner—Jerome Grant, II
(74) Attorney, Agent, or Firm—Sughrue Mion, PLLC

(57) ABSTRACT

The image processing apparatus outputs both of first image data used to produce a photo-print and second image data used to produce an image file in accordance with the digital image data. The processing apparatus includes a printing magnification determining device for determining printing magnification used when the photo-print is outputted in such a manner that a printing size is inscribed in a standard scanning area which is previously defined based upon longitudinal/transverse sizes every sort of an original and a digitizing magnification determining device for determining digitizing magnification used when the image file is outputted in such a manner that an image file size which is previously defined based upon longitudinal/transverse pixel numbers every sort of the original is inscribed in or circumscribed about the standard scanning area. The image forming apparatus employs the processing apparatus and outputs both of the photo-print and the image file.

14 Claims, 1 Drawing Sheet

IMAGE PROCESSING APPARATUS CAPABLE OF FREELY VARYING ASPECT RATIO, AND IMAGE FORMING APPARATUS USING THE SAME

BACKGROUND OF THE INVENTION

1. Field of the Invention

The present invention generally relates to a digital image processing technique used in digital photoprinters and the like. More specifically, the present invention is directed to an image processing apparatus capable of outputting both photo-print data and image-file data, and also directed to an image forming apparatus with employment of such an image processing apparatus.

2. Description of the Related Art

Conventionally, when images which are photographed on photographic films known as negative films and reversal films are printed on photosensitive materials (photographic paper), a so-called "direct exposure method" has been mainly employed. That is, the images of the photographic films are projected onto the photographic materials and then the projected photographic materials are exposed.

In contrast to such a direct exposure method, very recently, printing apparatus using "digital exposure" methods are practically operable. In other words, digital photoprinters are commercially available. In such a digital photoprinter, while an image recorded on a photographic film (will be simply referred to as a "film" hereinafter) is read out in a photoelectric converting manner, the read image is converted into a digital image signal. Thereafter, this digital image signal is processed by performing various sorts of image processing operations so as to produce image data for recording purposes. Then, a photo-sensitive material is exposed by scanning the recording light which is modulated in response to this image data so as to record an image (latent image) on this photo-sensitive material. This recorded latent image is developed so as to be printed as a digital photo-print.

Basically, this digital photo-printer is arranged by a scanner (image reading apparatus), an image processing apparatus, a printer (image recording apparatus), and a processor (developing apparatus). In the scanner, the reading light is entered into a photographic film, and an image recorded on the film is read in a photoelectric manner by reading the projection light from this film. In the image processing apparatus, a predetermined process operation is carried out with respect to image data read by the scanner, or image data supplied from a digital camera and the like in order to produce such image data (exposure condition) suitable for image recording operation. In the printer, a photosensitive material is scanned/exposed by way of, for example, an optical beam scanning operation in response to the image data outputted from the image processing apparatus so as to record a latent image. In the processor, the photosensitive material exposed by the printer is developed so as to produce finished a photo-print on which the image is reproduced.

In accordance with such a digital photoprinter, since the image can be processed in the proper image processing manner by executing the image data processing operation, gradation control operation, color balance control operation, color density control operation, and the like are carried out in a proper manner, so that photo-prints having high image qualities can be obtained. Such high image qualities could not be obtained by the conventional direct exposure method.

Also, since images are handled as digital image data, digital photo-printers may output as photo-prints, not only images photographed on films, but also images photographed by a digital camera and so on, or images acquired by a communication device such as the Internet in such a digital photo-printer.

Furthermore, since images are handled as digital image data, not only photo-prints, but also image data (image files) of images reproduced on photo-prints may be outputted onto various sorts of recording media such as a CD-R and an MO (magneto optical recording medium) In response to requests of customers (persons who request to form photo-prints), a digital photo-printer may provide both photo-prints and image files (recording media for recording image files).

The applicant of the present invention has disclosed the image processing apparatus (image recording apparatus) capable of outputting both such photo-prints and also such image files in Japanese Patent Application Laid-open No. Hei. 10-117262, and No. Hei. 11-234514. The image processing/recording apparatus disclosed in these applications can output both the photo-prints and the image files so as to be provided for customers, if necessary.

Also, as one of specific printing requests made by customers, a so-called "trimming" function is provided, by which a portion of an image photographed on a film is cut out, and the cut image portion is enlarged to be reproduced as a photo-print, if required. Also, in digital photo-printers, such a "trimming" function requires cumbersome process operations such as cutting of images and variable magnification (magnifying power) process operation in combination with special manual works by operators. As to this specific printing request, the applicant has proposed the image processing apparatus in Japanese Patent Application Laid-open No. Hei. 11-177802. That is, in this image processing apparatus, while an aspect ratio of a trimming area is automatically set in response to a size of an output image (print), an operator instructs/adjusts trimming areas and/or trimming magnification, so that a trimming work by an operator can be carried out in a simple manner and also in a high efficiency. As a result, lowering of productivity caused by the trimming operation can be properly mitigated.

However, in the case that both the photo-prints and the image files are outputted by the digital photo-printer, since the total pixel numbers of these photo-prints and image files are different from each other and also the aspect ratios thereof are different from each other, the proper magnification should be determined with respect to both the photo-prints and the image files. When a trimming operation is carried out, there is such a problem that trimming effects can be hardly reflected on both the photo-prints and the image files in proper manners.

SUMMARY OF THE INVENTION

The present invention has been made to solve the above-described problems, and therefore, has an object to provide an image processing apparatus in which, even when an aspect ratio of a print output (photo-print image data) is different from an aspect ratio of an image file output (image file data), both the print output and the image file output can be realized within optimum reading ranges related to the respective outputs, while trimming operations of both the print and the image file can be carried out in a simple manner.

The present invention has also another object to provide an image forming apparatus with employment of such image processing apparatus.

In order to attain the object described above, the first aspect of the present invention provides an image processing apparatus for executing a predetermined image processing operation with respect to digital image data so as to output both of first image data used to produce a photo-print and second image data used to produce an image file in accordance with the digital image data, comprising: a printing magnification determining device for determining printing magnification used when the photo-print is outputted in such a manner that a printing size is inscribed in a standard scanning area which is previously defined based upon longitudinal/transverse sizes every sort of an original, the printing size being selected from a plurality of printing sizes which are defined based upon longitudinal/transverse sizes; and a digitizing magnification determining device for determining digitizing magnification used when the image file is outputted in such a manner that an image file size which is previously defined based upon longitudinal/transverse pixel numbers every sort of the original is inscribed in the standard scanning area.

In order to attain the object described above, the second aspect of the present invention provides an image processing apparatus for executing a predetermined image processing operation with respect to digital image data so as to output both of first image data used to produce a photo-print and second image data used to produce an image file in accordance with the digital image data, comprising: a printing magnification determining device for determining printing magnification used when the photo-print is outputted in such a manner that a printing size is inscribed in a standard scanning area which is previously defined based upon longitudinal/transverse sizes every sort of an original, the printing size being selected from a plurality of printing sizes which are defined based upon longitudinal/transverse sizes; and a digitizing magnification determining device for determining digitizing magnification used when the image file is outputted in such a manner that an image file size which is previously defined based upon longitudinal/transverse pixel numbers every sort of the original is circumscribed about the standard scanning area.

It is preferable that the image processing apparatus in the first and second aspects further comprises: an image display device for displaying at least an image within an area to be printed out; and a printing magnification changing device for changing the printing magnification; and wherein in such a case that the image within the area which is printed at the determined printing magnification is displayed on the image display device and also the image within the area is cut out in the displayed image by an operator, the printing magnification is changed.

It is also preferable that the image processing apparatus in the above aspects further comprises: an image display device for displaying at least an image within an area to be printed out; a printing magnification changing device for changing the printing magnification; and a digitizing magnification changing device for changing the digitizing magnification; and wherein in such a case that the image within the area which is printed at the determined printing magnification is displayed on the image display device and also the image of the area is cut out in the displayed image by an operator, the printing magnification is changed as well as the determined digitizing magnification is changed at the same ratio as the changed printing magnification.

In order to attain the object described above, the third aspect of the present invention provides an image forming apparatus comprising: an image reading unit for reading an image of an original in a photoelectrical manner to input the read image as digital image data; an image processing unit for executing a predetermined image processing operation with respect to the input digital image data; a print outputting unit for outputting first image data processed by the image processing unit as a photo-print; and an image file outputting unit for outputting second image data processed by the image processing unit as an image file; wherein both of the photo-print and the image file are outputted, the image processing unit outputs both of the first image data used to produce the photo-print and the second image data used to produce the image file in accordance with the digital image data, and said image processing apparatus described above is employed as said image processing unit.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Next, an image processing apparatus and also an image forming apparatus with employment of this image processing apparatus, according to the present invention, will now be described in detail based upon preferred embodiments represented in the accompanying drawings.

Figure 1:
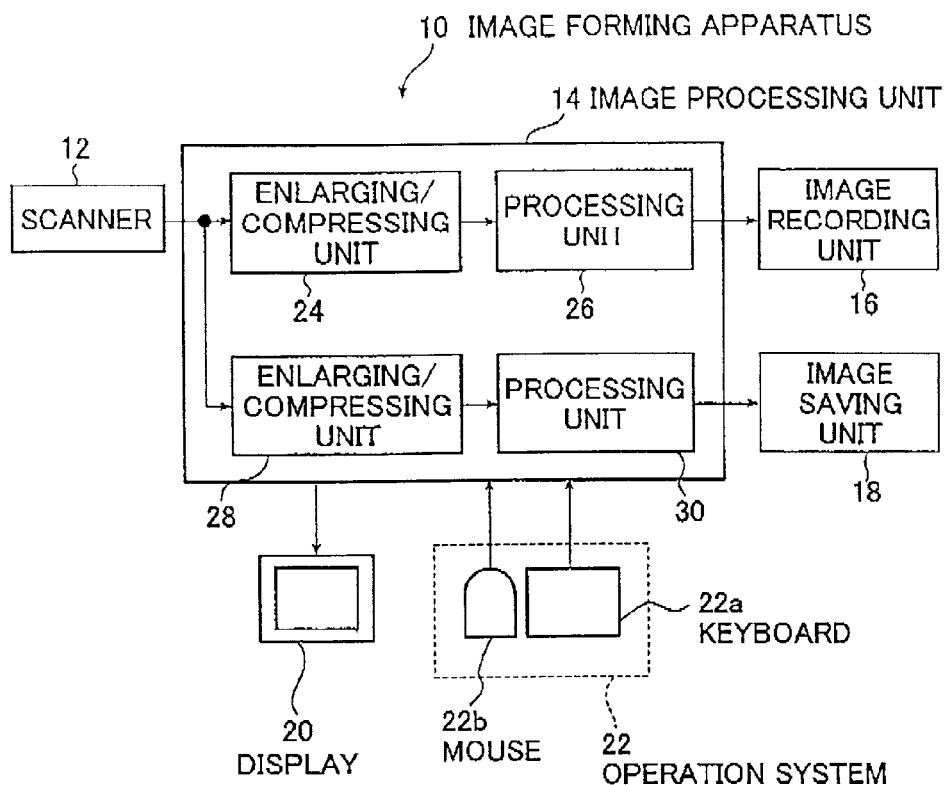
FIG. 1 is a schematic block diagram for representing an arrangement of an image forming apparatus realized by employing an image processing apparatus according to an embodiment of the present invention.

FIG. 1 is a schematic block diagram for indicating an arrangement of an image forming apparatus 10 using an image processing apparatus according to an embodiment of the present invention.

As indicated in FIG. 1, the image forming apparatus 10 is arranged by employing an image reading unit (scanner) 12, an image processing unit 14, an image recording unit (print outputting unit) 16, and an image saving unit (image file outputting unit) 18.

The scanner 12 reads an original image one image frame by one image frame photoelectrically in a photoelectric manner so as to acquire digital image data of this original image, and then, supplies the digital image data to the image processing unit 14. In this image forming apparatus 10, various exclusively-used carriers are prepared in accordance with various sorts of originals such as the advanced photo system (APS) and negative/reversal films of 135-size. Thus, this image forming apparatus 10 may be operated by accepting various types of original films. These exclusively-used carriers are freely mounted on a main body of the scanner 12. An image (image frame) which is photographed on a film so as to be used to form a photo-print is transported by using a selected Carrier to a predetermined reading position, and then, image data which is photoelectrically read is supplied to the image processing unit 14.

It should be understood that in order to determine an image processing condition and the like, a so-called "pre-scanning operation" is carried out prior to a so-termed "fine-scanning operation" in the image forming apparatus 10. In the pre-scanning operation, an image is read under low resolution condition. In the fine-scanning operation, the image is read in order to output a photo-print.

The image processing unit 14 is employed so as to send image data to the image recording unit 16 by which a photo-print is outputted. This image data is obtained by executing an image process operation such as various sorts of corrections with respect to the inputted image data. Further, the image processing unit 14 is employed to transmit this image data to the image saving unit 18 so as to output an image file. In the case that the image data which is entered from the image reading unit 12 to be transferred to the image processing unit 14 is inputted to the image processing unit 14, this image data is branched into two signal systems, namely a signal system for performing a print output process operation and another system for executing an image output process operation. The image processing unit 14 contains both an enlarging/compressing unit 24, and a processing unit 26 with respect to print-outputting image data, and both an enlarging/compressing unit 28 and a processing unit 30 with respect to image-file-outputting image data. The enlarging/compressing unit 24 determines print magnification and the processing unit 26 performs other image processing operations for the print image data. The enlarging/compressing unit 28 determines digitizing magnification and the processing unit 30 executes other image processing operations with respect to the image data for the image file.

Also, a display (image display means) 20, and an operation system 22 are connected to this image processing unit 14. The display 20 displays an image and the like, which are read by the scanner 12. The operation system 22 contains a keyboard 22a and a mouse 22b, which instruct an input of various conditions and a selection of process operations. While an operator views an image indicated on the display 20, the operator can instruct the operation system 22 to partially cut out (trimming) an image. When the trimming operation is carried out, the printing magnification and the digitizing magnification are changed by the enlarging/compressing units 24 and 28.

The image recording unit 16 contains a printer (not shown in detail), and a processor (not shown either) so as to output a printed photo-print. The printer scans/exposes a photosensitive material (not shown) by way of an optical beam scanning operation in response to the outputting image data in order to record a latent image. The processor executes a developing process operation with respect to the photosensitive material which is exposed by the printer so as to reproduce an image as the photo-print.

The image saving unit 18 outputs the image data to which the image process operation has been performed as an image file to various sorts of image files (recording media). In this case, as this image file, various sorts of recording media known in this technical field may be utilized, for example, a CD-R, and an MO, Smart Media (tradename of flash memory), an MD (Mini-Disk), Zip, a floppy disk, and the like. Alternatively, while image data are selected from a plurality of recording media, a file may be outputted. Also, image files to be outputted (recorded) to one recording medium may be selected in the unit of one frame, plural frames, one item, or plural items. Alternatively, these units may be arbitrarily selected.

Subsequently, operations of this embodiment of the present invention will now be explained.

A first description is made of the following case. That is, both printing magnification and digitizing magnification are determined in such a manner that both print sizes to be outputted and image file size (which have been compressed) to be outputted are inscribed in a standard scanning area in which print sizes and image file sizes are previously set with respect to sorts of originals An operator mounts a carrier corresponding to a photographic film under use on the scanner 12, sets this film to an preselected position of the carrier, and inputs necessary instructions such as an image frame from the operation system 22 so as to instruct a commencement of forming of a print. Based upon the necessary instructions, an image frame used to form a print (if all image frames are printed at same time, then this simultaneous printing operation is instructed), a print size, a total print number as to each image frame, and image data are outputted (stored) to a recording medium.

As a result, the pre-scanning operation is carried out, so that an image photographed on this film is read out in the photoelectric manner. It should also be understood that both the pre-scanning operation and the fine-scanning operation may be carried out every one image frame, or may be continuously performed every all of image frames, or a preselected plural number of image frames.

Also, in the case that image data is outputted as an image file to the recording medium (namely, image data is digitized), the operator inputs such information related to an image frame and a prints size, which are outputted as an image file by using the operation system 22.

Since input image data by the pre-scanning operation is assumed as digital image data, a reading condition of the fine-scanning operation is set. When a confirmation is carried out, image data which is scanned by the pre-scanning operation is processed based upon the preset image processing condition to be displayed as a simulation image on the display 20. While the operator views the display content of the display 20, the operator may confirm an image processing result, and controls the image processing condition by the operation station 22, if necessary. When the image processing condition is finally defined, the fine-scanning operation is commenced by the scanner 12.

The fine-scanning operation is carried out in a similar manner to the pre-scanning operation except that the reading conditions such as a diaphragm value of a variable diaphragm are different from each other. The reading operations of the respective image frames in the fine-scanning operation are carried out in accordance with the preset reading condition for the fine-scanning operation. The digital image data scanned by the fine-scanning operation is processed based upon the preset image processing condition to be converted into predetermined image data which will then be outputted.

In other words, print-outputting image data is processed based upon the enlarging/compressing process by the enlarging/compressing unit 24 for outputting the photo-print, and thereafter, the resultant image data is further processed based upon other image process operation by the processing unit 26. The finally-processed image data is outputted to the image recording unit (printer) 16. On the other hand, image-file-outputting image data is processed based upon the enlarging/compressing process by the enlarging/compressing unit 28 for outputting the image file, and thereafter, the resultant image data is further processed based upon other process operations by the processing unit 30. The finally-processed image data is outputted to the image saving unit 18.

Both the enlarging/compressing process unit 24 and the enlarging/compressing process unit 28 determine converting magnification (printing magnification, or digitizing magnification) used to convert an original image into an output image (photo-print, or image file).

Figure 2:
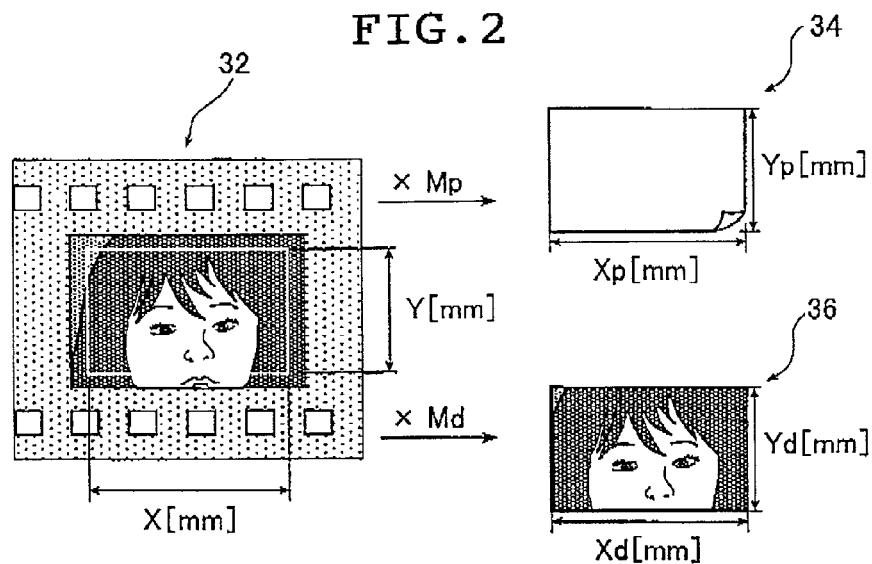
FIG. 2 is an explanatory diagram for explaining an magnification determining condition in the case that a photo-print is outputted and also an image file is outputted.

For instance, as indicated in FIG. 2, with respect to an original image 32, a photo-print 34, and an image file 36, it is so assumed that the respective sizes thereof are defined by a longitudinal size and a transverse size every sort of an original. In other words, it is so assumed that the standard scanning area of the original image is defined by X [mm]×Y [mm], the print size is defined by Xp [mm]×Yp [mm], and also the image file size is defined by Xd [mm]×Yd [mm]. As to the image file size, it is so assumed that this image file size is expressed in the unit of [mm] when an image file is converted/printed by using recording density of the print (photo-print).

In this case, while the standard scanning area is previously determined every sort of an original, as to the print size and the image tile size, desirable sizes are designated by a customer from a plurality of print sizes/image file sizes which are defined based upon longitudinal/transverse sizes, and then, the designated sizes are entered by an operator.

Also, it is so assumed that magnification of a print size with respect to the size of the original image (standard scanning area) is selected to be printing magnification "Mp", whereas magnification of an image file size is selected to be digitizing magnification "Md" with respect to this standard scanning area.

At this time, in this embodiment, both the printing magnification and the digitizing magnification are determined in such a manner that both the print size and the image file size are inscribed in the above-explained standard scanning area.

The expression "inscribing" implies, for instance, that when the print 34 is compressed (or enlarged) by the printing magnification of (1/Mp), the compressed (or enlarged) print 34 may be inscribed in the standards scanning area of the original image 32. Similarly, when the image file 36 is compressed (or enlarged) by the digitizing magnification of (1/Md), the compressed (or enlarged) image file 36 may be inscribed in the standard scanning area of the original image 32.

Concretely speaking, when the above-described magnification conditions are expressed by way of formulae, the following formulae conditions can be established.

With respect to the printing magnification Mp, in the case of $Xp/X \leq Yp/Y$, the resultant printing magnification is assumed as Mp=Yp/Y, whereas in the case of $Xp/X > Yp/Y$, the resultant printing magnification is assumed as Mp=Xp/X. Also, with respect to the digitizing magnification Md, in the case the $Xd/X \leq Yd/Y$, the resultant digitizing magnification is assumed as Md=Yd/Y, whereas in the case of $Xd/X > Yd/Y$, the resultant digitizing magnification is assumed as Md=Xd/X.

As explained above, the reason why the print size is inscribed in the standard scanning area of the original image is given as follows: That is, in such a case that the print size is larger than the standard scanning area, a white portion having no image appears on the print. The reason why the image file size is inscribed in the standard scanning area of the original image is given as follows: That is, the image data is fetched into the image file in a full image size in order to obtain resembling images in view of impressions.

Such a decision of the printing magnification Mp is automatically carried out by the enlarging/compressing unit 24, and thereafter, the print-outputting image data is processed based upon other image processing operations by the processing unit 26. Then, the processed image data is supplied to the image recording unit 16 so as to be outputted as a photo-print.

Also, such a decision of the digitizing magnification Md is automatically carried out by the enlarging/compressing unit 28, and thereafter, the image-file-outputting image data is processed based upon other image processing operations by the processing unit 30. Then, the processed image data is supplied to the image saving unit 18 so as to be outputted as an image file.

Next, a second embodiment of the present invention will now be explained.

This second embodiment is substantially equal to the first embodiment, but owns such a different point. That is, digitizing magnification is determined in such a manner that an image file size is circumscribed about the standard scanning area.

In other words, in this second embodiment, as to a print size, printing magnification is determined in such a manner that the print size is inscribed in the standard scanning area similar to the first embodiment, whereas as to an image file size, digitizing magnification is determined in such a manner that this image file size is circumscribed about the standard scanning area.

In other words, in this second embodiment, as to a print size, printing magnification is determined in such a manner that the print size is inscribed in the standard scanning area similar to the first embodiment, whereas as to an image file size, digitizing magnification is determined in such a manner that this image file size is circumscribed about the standard scanning area.

In this case, the expression "circumscribing" implies that when an image file is compressed (enlarged), the compressed (enlarged) image file is circumscribed about the standard scanning area As a result, all of scanned image data are saved in an image file without any drop out.

Concretely speaking, with respect to digitizing magnification Md, when $Xd/X \leq Yd/Y$, this digitizing magnification Md is equal to Xd/X, whereas when $Xd/X > Yd/Y$, this digitizing magnification Md is equal to Yd/Y.

Next, third embodiment of the present invention will now be described,

This third embodiment is related to a decision of magnification in the case that an image is cut out (trimmed).

When a trimming operation is designated by an operator in response to a request of a customer, the present operation mode is entered into a trimming mode. In this trimming mode, an image of an area which is printed based upon determined printing magnification is indicated on the display 20 in a pre-view display manner, and while the operator views this previewed image, this operator instructs a cutting frame of the trimming operation. When the operator designates both the cutting frame and a print size for outputting the trimmed image, an aspect ratio is automatically set in response to these instructed contents. In response to this automatically set aspect ratio, the printing magnification Mp determined in a similar manner to that of the above-explained embodiment is changed. A cutting frame (trimming frame) corresponding to the set aspect ratio is indicated on the display 20.

In this manner, such an image which is printed out in accordance with the changed printing magnification is again displayed on the display 20 in the pre-view display manner. When the operator confirms this preview display and then instructs the execution, this image is printed out in accordance with the changed printing magnification Mp1.

On the other hand, at this time, digitizing magnification is also determined in a similar manner to the above-described embodiment. This digitizing magnification is automatically changed at the same ratio obtained in the case that the above-explained printing magnification is changed. In other words, the changed digitizing magnification Md1 is given as follows: Md1=Md×(Mp1/Mp). As described above, the digitizing magnification may also be changed based upon the same ratio as that of the changed printing magnification. As a result, the image file output data may own similar impressions to those of the print output, namely may similarly reflect the image.

Finally, a description will now be made of a fourth embodiment of the present invention.

Similar to the above-described third embodiment, this fourth embodiment is related to such a case that a trimming operation is carried out. That is, while printing magnification is changed in a similar to the third embodiment, digitizing magnification is not changed, but an image file is outputted which is enlarged based upon digitizing magnification originally determined by the enlarging/compressing unit 28.

In other words, as to the image file output, no trimming operation is carried out. As a result, with respect to the image file output, it is possible to avoid a loss of image data.

That is to say, digitizing magnification is not changed, but the same image range is continuously acquired. As a consequence, when an image is again printed out from the digitized image data, there is no possibility that the information is dropped out.

As explained in detail, in accordance with this fourth embodiment, while the standard scanning area guaranteed by the apparatus is determined as the image readout range, the selection is made of such magnification which is inscribed to the output size. As a consequence, even when the aspect ratio owns any rules when the image is outputted, the images can be produced within the optimum reading range. Also, when the digitizing magnification is determined, since the output size is circumscribed about the standard scanning area, no information is dropped out in such a case that the photo-print is thereafter produced from the image file. Furthermore, when the trimming operation is carried out, the pre-view operation is carried out only when the print is outputted. When the image file is outputted, since the magnification is controlled based upon the equal ratios, both the photo-print and the image file can be trimmed by only controlling the magnification.

Otherwise, digitizing magnification is not changed, but the same image range is continuously acquired. As a consequence, when an image is again printed out from the digitized image data, there is no possibility that the information is dropped out, resulting in an effect of this embodiment.

While the image processing apparatus and the image forming apparatus, according to the present invention, have been described in detail, the present invention is not limited only to the above-described embodiments, but may be modified, changed, and substituted, departing from the technical scope and spirit of the present invention.

As previously explained, in accordance with the present invention, even when the aspect ratio of the print output is different from the aspect ratio of the image file output, the photo-print can be produced and also the image file can be produced within the respective optimum image reading ranges.

In a case in which when the trimming operation is carried out in the pre-view-display of any one of the print output and the image file output, the magnification change of the other case is automatically carried out at the same ratio, both the photo-print and the image file can be trimmed in the simple operation.

What is claimed is:

1. An image processing apparatus for executing a predetermined image processing operation with respect to digital image data so as to output both of first image data used to produce a photo-print and second image data used to produce an image file in accordance with said digital image data, comprising:
   a printing magnification determining device for determining printing magnification used when said photo-print is outputted in such a manner that a printing size is inscribed in a standard scanning area which is previously defined based upon longitudinal/transverse sizes every sort of an original, said printing size being selected from a plurality of printing sizes which are defined based upon longitudinal/transverse sizes; and
   a digitizing magnification determining device for determining digitizing magnification used when said image file is outputted in such a manner that an image file size which is previously defined based upon longitudinal/transverse pixel numbers every sort of the original is inscribed in said standard scanning area.

2. The image processing apparatus as claimed in claim 1, further comprising:
   an image display device for displaying at least an image within an area to be printed out; and
   a printing magnification changing device for changing said printing magnification; and wherein:
   in such a case that the image within the area which is printed at said determined printing magnification is displayed on said image display device and also said image within the area is cut out in said displayed image by an operator, said printing magnification is changed.

3. The image processing apparatus as claimed in claim 1, further comprising:
   an image display device for displaying at least an image within an area to be printed out;
   a printing magnification changing device for changing said printing magnification; and
   a digitizing magnification changing device for changing said digitizing magnification; and wherein:
   in such a case that the image within the area which is printed at said determined printing magnification is displayed on said image display device and also said image of the area is cut out in said displayed image by an operator, said printing magnification is changed as well as said determined digitizing magnification is changed at the same ratio as said changed printing magnification.

4. The apparatus of claim 1, wherein the first image data to produce the photo-print and the second image data to produce the image file have different aspect ratios.

5. The apparatus of claim 1, wherein an original image has dimensions Y×X, wherein the printing size has the dimensions Yp×Xp, wherein in case of Xp/X=<Yp/Y, the printing magnification is a function of Yp/Y, else the printing magnification is a function of Xp/X.

6. An image processing apparatus for executing a predetermined image processing operation with respect to digital image data so as to output both of first image data used to produce a photo-print and second image data used to produce an image file in accordance with said digital image data, comprising:
   a printing magnification determining device for determining printing magnification used when said photo-print is outputted in such a manner that a printing size is inscribed in a standard scanning area which is previously defined based upon longitudinal/transverse sizes every sort of an original, said printing size being selected from a plurality of printing sizes which are defined based upon longitudinal/transverse sizes; and a digitizing magnification determining device for determining digitizing magnification used when said image file is outputted in such a manner that an image file size which is previously defined based upon longitudinal/transverse pixel numbers every sort of the original is circumscribed about said standard scanning area.

7. The image processing apparatus as claimed in claim 6, further comprising: an image display device for displaying at least an image within an area to be printed out; and
a printing magnification changing device for changing said printing magnification; and wherein:
in such a case that the image within the area which is printed at said determined printing magnification is displayed on said image display device and also said image within the area is cut out in said displayed image by an operator, said printing magnification is changed.

8. The image processing apparatus as claimed in claim 6, further comprising:
an image display device for displaying at least an image within an area to be printed out;
a printing magnification changing device for changing said printing magnification; and
a digitizing magnification changing device for changing said digitizing magnification; and wherein:
in such a case that the image within the area which is printed at said determined printing magnification is displayed on said image display device and also said image of the area is cut out in said displayed image by an operator, said printing magnification is changed as well as said determined digitizing magnification is changed at the same ratio as said changed printing magnification.

9. An image forming apparatus comprising:
an image reading unit for reading an image of an original in a photoelectrical manner to input the read image as digital image data;
an image processing unit for executing a predetermined image processing operation with respect to the input digital image data;
a print outputting unit for outputting first image data processed by said image processing unit as a photo-print; and
an image file outputting unit for outputting second image data processed by said image processing unit as an image file; wherein:
both of said photo-print and said image file are outputted; and
said image processing unit for outputting both of the first image data used to produce the photo-print and the second image data used to produce the image file in accordance with said digital image data, comprises:
a printing magnification determining device for determining printing magnification used when said photo-print is outputted in such a manner that a printing size is inscribed in a standard scanning area which is previously defined based upon longitudinal/transverse sizes every sort of the original, said printing size being selected from a plurality of printing sizes which are defined based upon longitudinal/transverse sizes; and
a digitizing magnification determining device for determining digitizing magnification used when said image file is outputted in such a manner that an image file size which is previously defined based upon longitudinal/transverse pixel numbers every sort of the original is inscribed in said standard scanning area.

10. The image forming apparatus as claimed in claim 9, wherein said image processing unit further comprises:
an image display device for displaying at least an image within an area to be printed out; and
a printing magnification changing device for changing said printing magnification; and wherein:
in such a case that the image within the area which is printed at said determined printing magnification is displayed on said image display device and also said image within the area is cut out in said displayed image by an operator, said printing magnification is changed.

11. The image forming apparatus as claimed in claim 9 wherein said image processing unit further comprises:
an image display device for displaying at least an image within an area to be printed out;
a printing magnification changing device for changing said printing magnification; and
a digitizing magnification changing device for changing said digitizing magnification; and wherein:
in such a case that the image within the area which is printed at said determined printing magnification is displayed on said image display device and also said image of the area is cut out in said displayed image by an operator, said printing magnification is changed as well as said determined digitizing magnification is changed at the same ratio as said changed printing magnification.

12. An image forming apparatus comprising:
an image reading unit for reading an image of an original in a photoelectrical manner to input the read image as digital image data;
an image processing unit for executing a predetermined image processing operation with respect to the input digital image data;
a print outputting unit for outputting first image data processed by said image processing unit as a photo-print; and
an image file outputting unit for outputting second image data processed by said image processing unit as an image file; wherein:
both of said photo-print and said image file are outputted; and
said image processing unit for outputting both of the first image data used to produce the photo-print and the second image data used to produce the image file in accordance with said digital image data, comprises:
a printing magnification determining device for determining printing magnification used when said photo-print is outputted in such a manner that a printing size is inscribed in a standard scanning area which is previously defined based upon longitudinal/transverse sizes every sort of the original, said printing size being selected from a plurality of printing sizes which are defined based upon longitudinal/transverse sizes; and
a digitizing magnification determining device for determining digitizing magnification used when said image file is outputted in such a manner that an image file size which is previously defined based upon longitudinal/transverse pixel numbers every sort of the original is circumscribed about said standard scanning area.

13. The image forming apparatus as claimed in claim 12, wherein said image processing unit further comprises:
an image display device for displaying at least an image within an area to be printed out; and
a printing magnification changing device for changing said printing magnification; and wherein:
in such a case that the image within the area which is printed at said determined printing magnification is displayed on said image display device and also said image within the area is cut out in said displayed image by an operator, said printing magnification is changed.

14. The image forming apparatus as claimed in claim 12 wherein said image processing unit further comprises:
an image display device for displaying at least an image within an area to be printed out;
a printing magnification changing device for changing said printing magnification; and
a digitizing magnification changing device for changing said digitizing magnification; and wherein:
in such a case that the image within the area which is printed at said determined printing magnification is displayed on said image display device and also said image of the area is cut out in said displayed image by an operator, said printing magnification is changed as well as said determined digitizing magnification is changed at the same ratio as said changed printing magnification.

* * * * *